S. B. GOFF.
COOKING APPARATUS.
APPLICATION FILED OCT. 7, 1913.
1,109,828.
Patented Sept. 8, 1914.
2 SHEETS—SHEET 2.
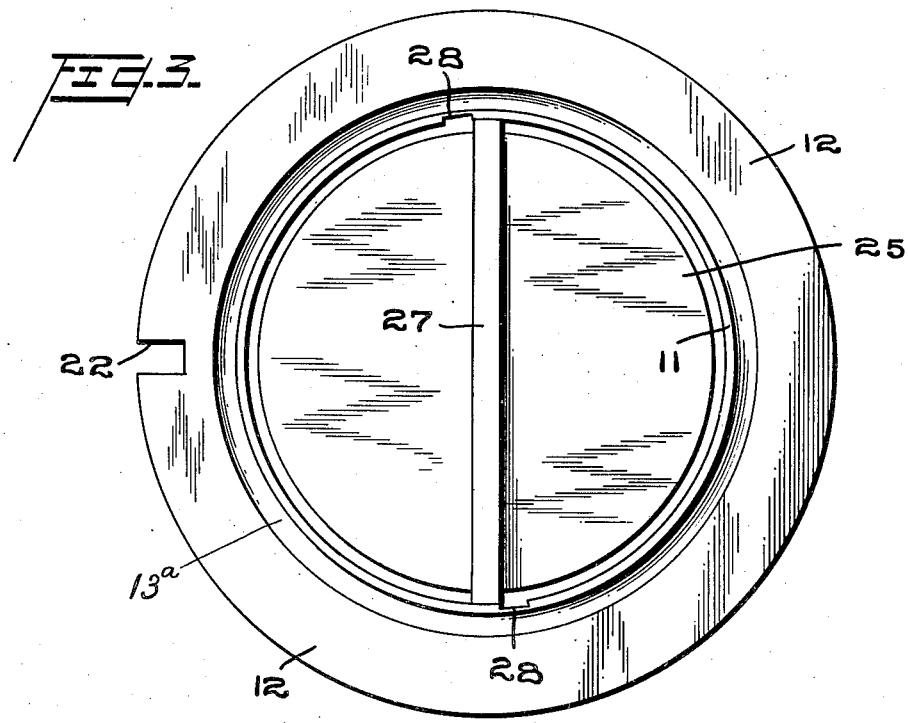
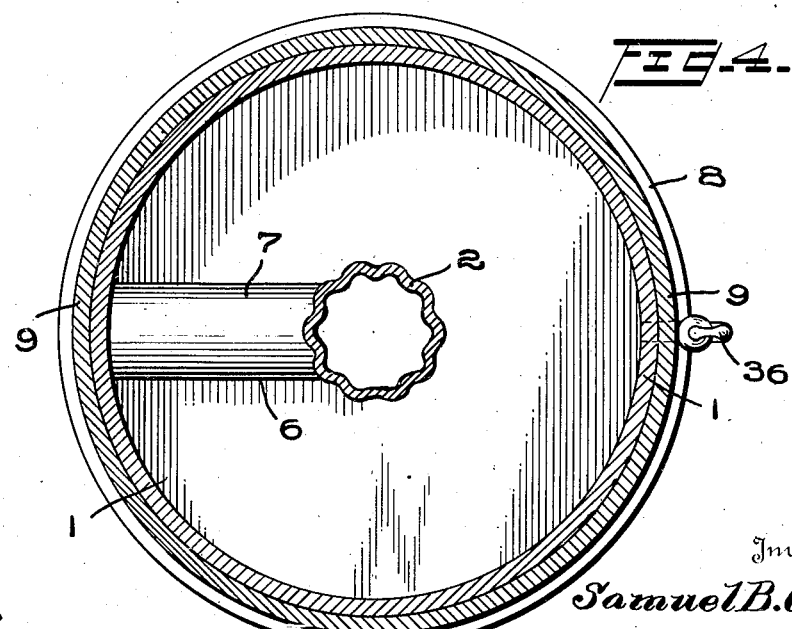
Inventor
Samuel B. Goff.
By Joshua R. H. Potts.
Attorney
Witnesses

UNITED STATES PATENT OFFICE.

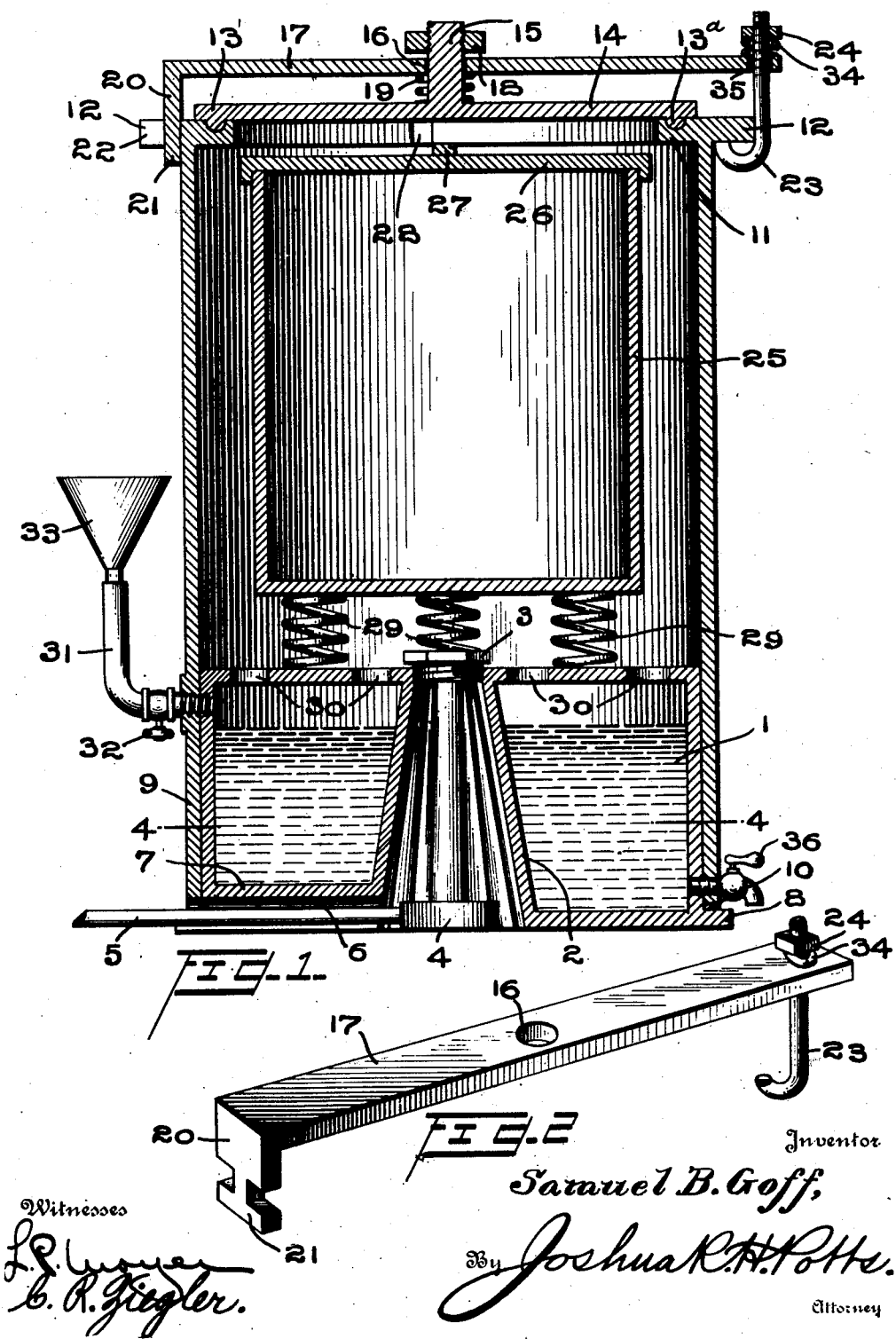

SAMUEL B. GOFF, OF CAMDEN, NEW JERSEY.

COOKING APPARATUS.

1,109,828.         Specification of Letters Patent.     Patented Sept. 8, 1914.

Application filed October 7, 1913. Serial No. 793,805.

*To all whom it may concern:*

Be it known that I, SAMUEL B. GOFF, a citizen of the United States, residing at Camden, in the county of Camden and State of New Jersey, have invented certain new and useful Improvements in Cooking Apparatus, of which the following is a specification.

My invention relates to improvements in cooking apparatus, an object of the invention being to provide a cooking apparatus with improved means for heating water to generate steam and utilize the same in cooking.

A further object is to provide an improved cooking apparatus comprising a casing having improved means thereon for supporting a cooking receptacle and maintaining the same steam tight within the casing.

With these and other objects in view, the invention consists in certain novel features of construction and combinations and arrangements of parts as will be more fully hereinafter described and pointed out in the claims.

In the accompanying drawings: Figure 1 is a view in vertical section illustrating my improvements. Fig. 2 is a perspective view of the cover locking bar. Fig. 3 is a plan view of the apparatus with the cover removed, and Fig. 4 is a view in horizontal section on the line 4—4 of Fig. 1.

1 represents a cylindrical boiler having a central conical integral chamber 2 which extends entirely through the boiler, and is preferably corrugated as shown to utilize the maximum of radiating surface with the metal. This conical chamber 2 may be closed at its upper end by a threaded plug 3, and is adapted to receive in its lower end, a burner 4 to heat the water in boiler 1.

The pipe 5, supplying gas to the burner 4, extends through a radial passage 6 in the bottom of the boiler, said passage formed by arching the bottom of the boiler as shown at 7 to provide ample space for the pipe and to allow air to freely enter the chamber 2 and pass up through the chamber when the plug 3 is removed.

The boiler 1 is formed at its lower edge with an annular flange 8 against which the lower edge of an oven casing 9 bears, and is preferably connected by cement 10 to prevent leakage at this point.

The oven casing 9 conforms to the shape of the boiler, and snugly fits the same, and extends above the boiler any desired distance to provide ample space for cooking. The oven casing 9 at its upper edge is provided with an internal annular flange 11, and an external annular flange 12. The internal annular flange has a groove 13 in its upper edge to receive a circular bead 13ª on a cover 14, and insure a steam tight juncture at this point.

The cover 14 is provided with an integral upwardly projecting screw-threaded stud 15 which projects through a relatively large opening 16 in a locking bar 17, and a nut 18 is screwed onto the upper end of the stud. A coiled spring 19 is located around the stud between the cover 14 and the bar 17, and one end of the bar extends downwardly at a right angle to the bar as shown at 20, and is recessed in opposite sides forming a T-head 21 which is adapted to lock under the flange 12 when the recessed portion thereof is located in a recess 22 in flange 12.

A hook bolt 23 extends through the opposite end of the bar 17, and is provided above the bar with a nut 24 to adjust the hook bolt vertically, and I would have it understood that I might provide other forms of adjusting means if desired.

When the T-head 21 is located in locked position with one side of the flange 12, the bar 17 may be moved downwardly against the action of spring 19 and hook bolt 23 turned to engage under the flange 12 when the bar will be securely held and the spring 19 will exert a downward pressure on the cover 14 to hold the latter in closed position, yet permit steam to escape if the pressure within the oven exceeds the closing pressure of the spring 19, thereby acting as a safety device to prevent possibility of bursting the oven.

25 represents a receptacle for food to be cooked. This receptacle is provided with a cover 26, and a bar 27 is located above the cover 26 and positioned against the under face of the flange 11. The flange 11 is recessed at opposite sides as shown at 28, so that the bar may be readily positioned through these recesses and when turned slightly will engage under the flange 11 and be held in this position by the upward pressure of coiled springs 29, which are located between the bottom of receptacle 25 and the top of boiler 1, exerting a constant upward pressure on the receptacle and holding the cover 26 tightly in closed position, yet allowing the steam to freely encompass the receptacle 25 and insure a rapid cooking.

The top of the boiler 1 is provided with openings 30 through which the steam readily escapes into the oven 9, and if dry cooking is desired, the plug 3 may be removed and the dry heat allowed to enter the oven. An inlet 31 is provided for water to pass to the boiler 1, and this inlet has a cock 32 to cut off the supply whenever desired. The inlet 31 is illustrated as a pipe having a funnel shaped open end 33, and screw-threaded at its other end and screwed through both the wall of oven 9 and boiler 1, acting as a further coupling means between these parts.

While I rely upon the spring 19 to hold the cover 14 in closed position, if desired, I can increase the holding means for the cover by tightening the nuts 18 and 24 which increases the tension of the spring and securely binds the cover.

To allow for further movement of the parts in securing the cover, and to permit the escape of steam when the pressure becomes excessive, I provide a coiled spring 34 between nut 24 and the bar 17, and locate the hook bolt 23 in a slot 35 in the bar, so that a certain amount of play is permitted at this point.

To drain the boiler, I may of course provide various forms of outlet, but have illustrated a simple form of cock 36 for this purpose.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A cooking apparatus, comprising a casing, a cover on the casing, a bar across the casing inside the cover, a boiler located within the lower portion of the casing and having a perforated top, a receptacle cover against the lower face of the bar, a receptacle against the lower face of said last-mentioned cover, and springs exerting upward pressure on the receptacle holding it against the last-mentioned cover and elevating the bottom of the receptacle above the perforated top of the boiler, substantially as described.

2. A cooking apparatus comprising a casing, a cover on the casing, a boiler fitting within the lower portion of the casing and having a central burner receiving passage extending entirely through the boiler, a plug adapted to close the upper end of the passage, a cock extending through both the boiler and the wall of the casing, said boiler having a transverse passage in its bottom communicating with a recess in the bottom of the receptacle for the admission of a pipe to supply the burner when the latter is in the first-mentioned passage, and means for holding a receptacle within the casing spaced above the boiler, substantially as described.

3. A cooking apparatus comprising a casing, a cover on the casing, a boiler fitting within the lower portion of the casing and having a central burner receiving passage extending entirely through the boiler, a plug adapted to close the upper end of the passage, said boiler having a perforated top, a receptacle within the casing, and means within the casing supporting the receptacle with all of its walls spaced from the walls of the receptacle and above the perforated top of the boiler, substantially as described.

4. A cooking apparatus, comprising a casing, a cover on the casing, a bar across the casing inside the cover, a boiler located within the lower portion of the casing and having a perforated top, a receptacle cover against the lower face of the bar, a receptacle against the lower face of said last-mentioned cover, springs exerting upward pressure on the receptacle holding it against the last-mentioned cover and elevating the bottom of the receptacle above the perforated top of the boiler, said boiler having its central passage corrugated circumferentially with its upper end screw-threaded for the reception of the plug, substantially as described.

5. A cooking apparatus comprising a casing, a cover on the casing, a boiler fitting within the lower portion of the casing and having a central burner receiving passage extending entirely through the boiler, a plug adapted to close the upper end of the passage, a cock extending through both the boiler and the wall of the casing, said boiler having a transverse passage in its bottom communicating with a recess in the bottom of the receptacle for the admission of a pipe to supply the burner when the latter is in the first-mentioned passage, means for holding a receptacle within the casing spaced above the boiler, said boiler having its central passage corrugated circumferentially with its upper end screw-threaded for the reception of the plug, substantially as described.

6. A cooking apparatus comprising a casing, a cover on the casing, a boiler fitting within the lower portion of the casing and having a central burner receiving passage extending entirely through the boiler, a plug adapted to close the upper end of the passage, said boiler having a perforated top, a receptacle within the casing, means within the casing supporting the receptacle with all of its walls spaced from the walls of the receptacle and above the perforated top of the boiler, said boiler having its central
5 passage corrugated circumferentially with its upper end screw-threaded for the reception of the plug, substantially as described.

In testimony whereof I have signed my name to this specification in the presence of two subscribing witnesses.

SAMUEL B. GOFF.

Witnesses:
M. E. DITTUS,
CHAS. E. POTTS.